United States Patent
Aaker et al.

(10) Patent No.: US 9,921,327 B2
(45) Date of Patent: Mar. 20, 2018

(54) SUBMERGED FRONT END BUOY

(71) Applicant: CGG SERVICES SA, Massy (FR)

(72) Inventors: Hans Aaker, Borgheim (NO); Thomas Elboth, Oslo (NO); Charlotte Sanchis, Oslo (NO)

(73) Assignee: CGG SERVICES SAS, Massy (FR)

( * ) Notice: Subject to any disclaimer, the term of this patent is extended or adjusted under 35 U.S.C. 154(b) by 163 days.

(21) Appl. No.: 14/969,303

(22) Filed: Dec. 15, 2015

(65) Prior Publication Data

US 2016/0282492 A1    Sep. 29, 2016

Related U.S. Application Data

(60) Provisional application No. 62/137,867, filed on Mar. 25, 2015.

(51) Int. Cl.
| | | |
|---|---|---|
| *G01V 1/38* | (2006.01) | |
| *B63B 21/66* | (2006.01) | |
| *B63G 8/42* | (2006.01) | |

(52) U.S. Cl.
CPC .......... *G01V 1/3817* (2013.01); *B63B 21/663* (2013.01); *B63G 8/42* (2013.01); *G01V 1/38* (2013.01)

(58) Field of Classification Search
CPC .......... G01V 1/3817; G01V 1/38; B63G 8/42; B63B 21/663
USPC .......................................................... 367/18
See application file for complete search history.

(56) References Cited

U.S. PATENT DOCUMENTS

| | | |
|---|---|---|
| 3,179,962 A | 4/1965 | Shear et al. |
| 3,257,672 A | 6/1966 | Meyer et al. |
| 3,332,058 A | 7/1967 | Loper et al. |
| 3,335,685 A | 8/1967 | Gimbel |
| 3,368,515 A | 2/1968 | Endo |
| 3,385,391 A | 5/1968 | McLoad |
| 3,436,776 A | 4/1969 | Davis |
| 3,512,493 A | 5/1970 | Hallanger |
| 3,860,983 A | 1/1975 | Furth et al. |
| 3,909,774 A | 9/1975 | Pavey, Jr. |
| 4,028,759 A | 6/1977 | Toups |
| 4,266,500 A | 5/1981 | Jurca |
| 4,549,499 A | 10/1985 | Huffhines et al. |

(Continued)

FOREIGN PATENT DOCUMENTS

| | | |
|---|---|---|
| CN | 202863746 U | 4/2014 |
| DE | 102011057091 A1 | 7/2013 |

(Continued)

OTHER PUBLICATIONS

Search Report in corresponding European Application No. EP 15 30 7105 dated Aug. 16, 2016.

(Continued)

*Primary Examiner* — Daniel L Murphy
(74) *Attorney, Agent, or Firm* — Patent Portfolio Builders PLLC

(57) ABSTRACT

A submerged front end buoy has a body with a connecting mechanism for connecting to a lead-in cable and a seismic streamer. A depth adjustment mechanism is disposed within the body to set a depth of the submerged front end buoy and includes an adjustable buoyancy mechanism and a plurality of wings extending from an exterior surface of the body.

20 Claims, 8 Drawing Sheets

(56) References Cited

U.S. PATENT DOCUMENTS

| | | |
|---|---|---|
| 4,677,931 A | 7/1987 | Buckle |
| 4,716,553 A | 12/1987 | Dragsund et al. |
| 4,745,583 A | 5/1988 | Motal |
| 6,142,092 A | 11/2000 | Coupland |
| 7,290,496 B2 | 11/2007 | Asfar et al. |
| 7,921,795 B2 | 4/2011 | Imlach et al. |
| 8,100,074 B2 | 1/2012 | Cameron et al. |
| 8,136,470 B1 | 3/2012 | Buescher et al. |
| 8,570,829 B2 | 10/2013 | Hovland et al. |
| 8,817,574 B2 * | 8/2014 | Elvestad ............... B63B 21/66 114/245 |
| 9,389,328 B2 * | 7/2016 | Schneider ............... B63G 8/14 |
| 2010/0197181 A1 | 8/2010 | Wainman |
| 2010/0226204 A1 | 9/2010 | Gagliardi et al. |
| 2011/0158045 A1 | 6/2011 | Karlsen et al. |
| 2011/0205839 A1 | 8/2011 | Südow et al. |
| 2012/0120759 A1 | 5/2012 | Le Page et al. |
| 2013/0088937 A1 | 4/2013 | Sykes |
| 2013/0182531 A1 | 7/2013 | Gagliardi et al. |
| 2014/0153360 A1 | 6/2014 | Tonchia |
| 2014/0162509 A1 | 6/2014 | Harrington |
| 2014/0241123 A1 | 8/2014 | Sallas et al. |
| 2014/0242694 A1 | 8/2014 | Hur et al. |
| 2014/0283725 A1 | 9/2014 | Jouffroy et al. |
| 2014/0301163 A1 | 10/2014 | Welker |
| 2014/0314491 A1 | 10/2014 | Fraiche et al. |

FOREIGN PATENT DOCUMENTS

| | | |
|---|---|---|
| EP | 2639601 A2 | 9/2013 |
| FR | 2 496 277 | 6/1982 |
| WO | 2012/013962 A1 | 2/2012 |
| WO | 2014/185519 A1 | 11/2014 |

OTHER PUBLICATIONS

Oscillating Water Column, Technology, How it works, Oceanlinx, Powering a Sustainable Future, downloaded from the internet Dec. 30, 2015, http://www.oceanlinx.com/technology/how-it-works.

* cited by examiner (Prior-Art)

(Prior-Art)

SUBMERGED FRONT END BUOY

CROSS REFERENCE TO RELATED APPLICATIONS

This application claims priority and benefit from U.S. Provisional Patent Application No. 62/137,867, filed Mar. 25, 2015, for "Submerged Front End Buoy", the entire contents of which is incorporated herein by reference.

TECHNICAL FIELD

Embodiments of the subject matter disclosed herein generally relate to seismic streamers.

BACKGROUND

In marine based seismic acquisition systems, one or more vessels tow seismic sources and seismic receivers. A conventional marine based seismic acquisition system 10 is illustrated in FIG. 1. As illustrated, a single survey vessel 21 tows one or more streamers 22 that may extend over kilometers behind the vessel. Each streamer includes seismic receivers disposed along its length. One or more source arrays 23 may also be towed by the survey vessel 21 for generating seismic wave. Conventionally, the source arrays 23 are towed in front of the streamers 22 when viewed in accordance with a direction of travel of the survey vessel 21 as indicated by arrow A. The seismic waves generated by the source arrays 23 propagate downwards, penetrate the seafloor and are reflected by a reflecting structure at an interface between different layers of the subsurface. The reflected seismic waves propagate upwards and are detected by the seismic receivers or sensors mounted on the streamers 22 towed by the survey vessel 21.

When multiple streamers are used for seismic data acquisition, deflector devices 25, e.g., are used to maintain streamer separation. Lead-in devices 24 or lead-in cables are used to connect the vessel to the deflectors and each one of the streamers. In order to maintain (control) the streamer depth at the front of the array, floats or buoys 26 are normally attached in between or close to the connection point between the lead in cables and the streamer. As illustrated in FIG. 2, each buoy is located on the surface of the water 30 and is attached to the streamer or lead-in through a separate cable, chain or rope 28. The buoy provides sufficient buoyancy of the front of the streamer array and prevents the front of the streamer array from diving further below the surface of the water. While mechanisms are known to adjust the depth of front of the streamer array through adjustments in the length of the cable 28, the buoy remains on the surface of the water. In this conventional arrangement, the buoy and lead-in are susceptible to interference with the towed sources, and the buoy can also contact, for example, ice flows or other objects on the surface of the water.

Therefore, a need exists for a towed streamer and buoy arrangements that can provide the desired depth for the front of the streamer array while eliminating surface buoys. Such as system would also facilitate selective adjustment of this depth and retrieval of the streamer array.

SUMMARY

Embodiments are directed to a submerged front end buoy attached in line between the lead-in cable and the streamer of a marine seismic data acquisition array. The submerged front end buoy is configured to be positioned below the surface of the water and includes a depth adjustment mechanism that utilizes at least one of an adjustable buoyancy mechanism and wings to set, maintain and adjust the depth at which the submerged front end buoy moves through the water.

The adjustable buoyancy mechanism utilizes a chamber disposed in the body of the submerged front end buoy. This chamber is selectively filled with water and air to establish the desired buoyancy in the submerged front end buoy. Air or gas is provided from a source of compressed air or compressed gas in connected to the chamber. Water is obtained from the ambient environment through a controllable valve in communication with the chamber and the exterior surface of the body. Changing the proportion of water and air in the chamber modifies the depth of the submerged front end buoy. Thus, the submerged front end buoy sinks towards the bottom when the proportion of water increases in the chamber, and conversely, rises toward the sea surface when the proportion of air increases in the chamber. By controlling the submerged depth of the front end buoy, the minimum offset between any seismic source and the first receiver in the seismic streamer can be eliminated.

A plurality of vertical and horizontal control wings can also be provided extending out from the exterior surface of the submerged front end buoy to assist with lateral and horizontal steering respectively. In one embodiment, the depth-varying submerged front end buoy includes acoustic transponders to help in the positioning of the acoustic streamer spread and GPS antennas to position the acoustic network of the streamer. Additional attachment points can be provided on the exterior surface of the body to connect the submerged front end buoy to separation ropes to maintain streamer separation.

An embodiment is directed to a submerged front end buoy having a body, a connecting mechanism in communication with the body and a depth adjustment mechanism to set a depth of the front end buoy below a surface of the water. The connecting mechanism is configured to connect the front end buoy to at least one of a seismic streamer and a lead-in cable connected to the seismic streamer. In one embodiment, the connecting mechanism is further configured to space the body from the streamer a distance less than about 50 cm.

The connecting mechanism includes a first body attachment point disposed on the body and a first streamer attachment point configured to attach to the seismic streamer. The first body attachment point is in communication with the first streamer attachment point. The connecting mechanism can include a connecting cable attached to and extending between the first body attachment point and the first streamer attachment point, the connecting cable having a length of less than about 50 cm. The connecting mechanism can also include a swivel mechanism attached to the first streamer attachment point. The swivel mechanism is configured to facilitate relative movement between the first streamer attachment point and the streamer.

In one embodiment, the connecting mechanism includes a second body attachment point disposed on the body and a second streamer attachment point configured to attach to at least one of the seismic streamer and the lead-in cable. The second body attachment point is in communication with the second streamer attachment point. Preferably, the second streamer attachment point is configured to attach to the lead-in cable.

In one embodiment, the depth adjustment mechanism is an adjustable buoyancy mechanism having a chamber disposed within the body, a source of compressed air in communication with the chamber and a valve in fluid communication with the chamber and exterior surface of the body. The adjustable buoyancy mechanism also includes a control mechanism in communication with the source of compressed air and the valve to adjust a volume of water in the chamber to control buoyancy of the submerged front end buoy.

In one embodiment, the depth adjustment mechanism includes at least one control wing extending from the exterior surface of the body. This at least one control wing can be an active foil. In one embodiment, the at least one control wing includes a first control wing extending from the exterior surface of the body along a first axis and a pair of second control wings extending from opposites sides of the body along a second axis perpendicular to the first axis.

In one embodiment, a communication module is disposed in the body in communication with the depth adjustment mechanism for remote control of the depth of the submerged front end buoy. In addition, at least one of an acoustic transponder and a global positioning system is disposed within the body. In one embodiment, a plurality of additional attachment points are disposed along an exterior surface of the body.

An embodiment is directed to a submerged front end buoy system having a seismic streamer, a lead-in cable attached to the seismic streamer and a submerged front end buoy. The submerged front end buoy includes a body, a connecting mechanism in communication with the body and a depth adjustment mechanism to set a depth of the front end buoy below a surface of the water. The connecting mechanism includes a first body attachment point disposed on the body, a first streamer attachment point in communication with the seismic streamer, a second body attachment point disposed on the body, a second streamer attachment point in communication with the lead-in cable and two connecting cables. Each connecting cable is attached to and extends between each one of the first body attachment point and the first streamer attachment point and the second body attachment point and the second streamer attachment point.

In one embodiment, each connecting cable has a length of less than about 50 cm. In addition, the depth adjustment mechanism includes an adjustable buoyancy mechanism having a chamber disposed within the body, a source of compressed air in communication with the chamber, a valve in fluid communication with the chamber and exterior surface of the body. The depth adjustment mechanism also includes at least one control wing extending from an exterior surface of the body.

An embodiment is directed to a seismic data acquisition system having a seismic source spaced from a towing vessel, a seismic streamer extending from the towing vessel and a submerged front end buoy. The submerged front end buoy includes a body, a connecting mechanism in communication with the body and a depth adjustment mechanism. The connecting mechanism is configured to connect the front end buoy to the seismic streamer, and the depth adjustment mechanism sets a depth of the front end buoy below a surface of the water at a depth greater than the seismic source such that a lateral offset between the seismic source and the seismic streamer is zero.

In one embodiment, the connecting mechanism includes a first body attachment point disposed on the body, a first streamer attachment point in communication with the seismic streamer and a connecting cable attached to and extending between the first body attachment point and the first streamer attachment point. The connecting has a length of less than about 50 cm. The depth adjustment mechanism includes an adjustable buoyancy mechanism having a chamber disposed within the body, a source of compressed air in communication with the chamber and a valve in fluid communication with the chamber and exterior surface of the body. The depth adjustment mechanism also includes at least one control wing extending from an exterior surface of the body.

An embodiment is directed to a method for acquiring seismic data using a submerged front end buoy. A seismic source and a seismic streamer are towed behind a towing vessel. A connecting mechanism is used to attach a front end buoy to the seismic streamer. The connecting mechanism includes a first body attachment point disposed on a body of the front end buoy, a first streamer attachment point in communication with the seismic streamer and a connecting cable attached to and extending between the first body attachment point and the first streamer attachment point. The connecting cable has a length of less than about 50 cm.

A depth adjustment mechanism associated with the front end buoy is used to set a depth of the front end buoy below a surface of the water at a depth greater than the seismic source such that a lateral offset between the seismic source and the seismic streamer is zero. The depth adjustment mechanism includes an adjustable buoyancy mechanism having a chamber disposed within the body, a source of compressed air in communication with the chamber and a valve in fluid communication with the chamber and exterior surface of the body. The depth adjustment mechanism also includes at least one control wing extending from an exterior surface of the body.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
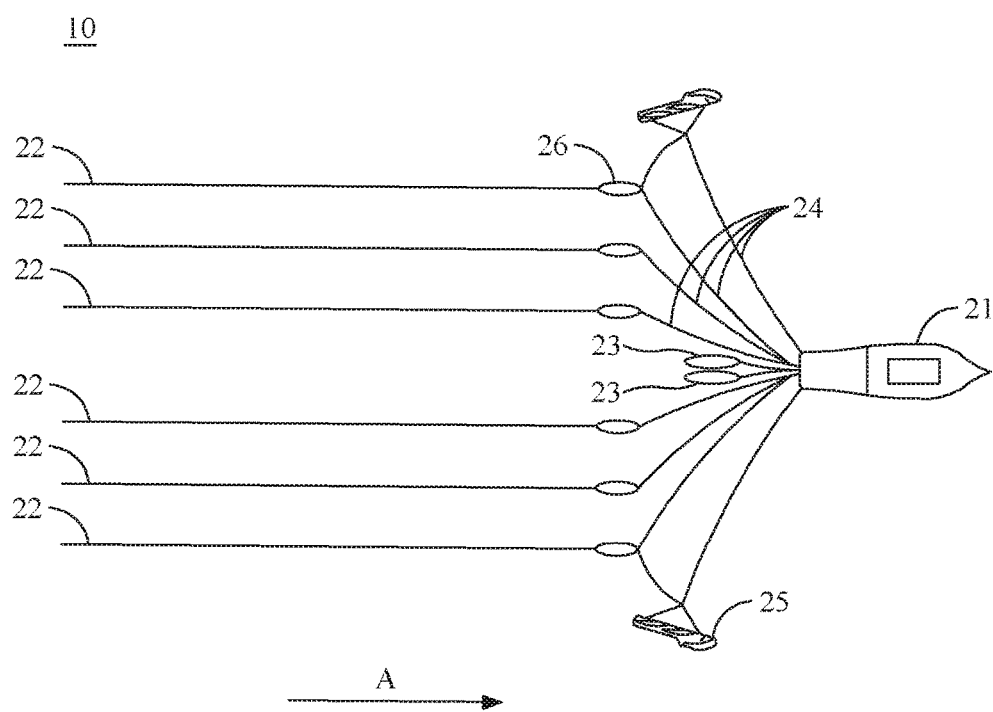
FIG. 1 is a representation of conventional towed seismic streamer array.
Figure 2:
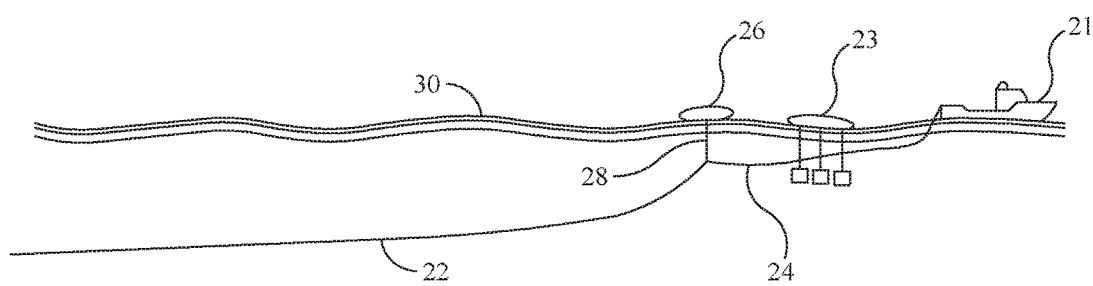
FIG. 2 is another representation of the towed seismic streamer array illustrating the surface location of a buoy.
Figure 3:
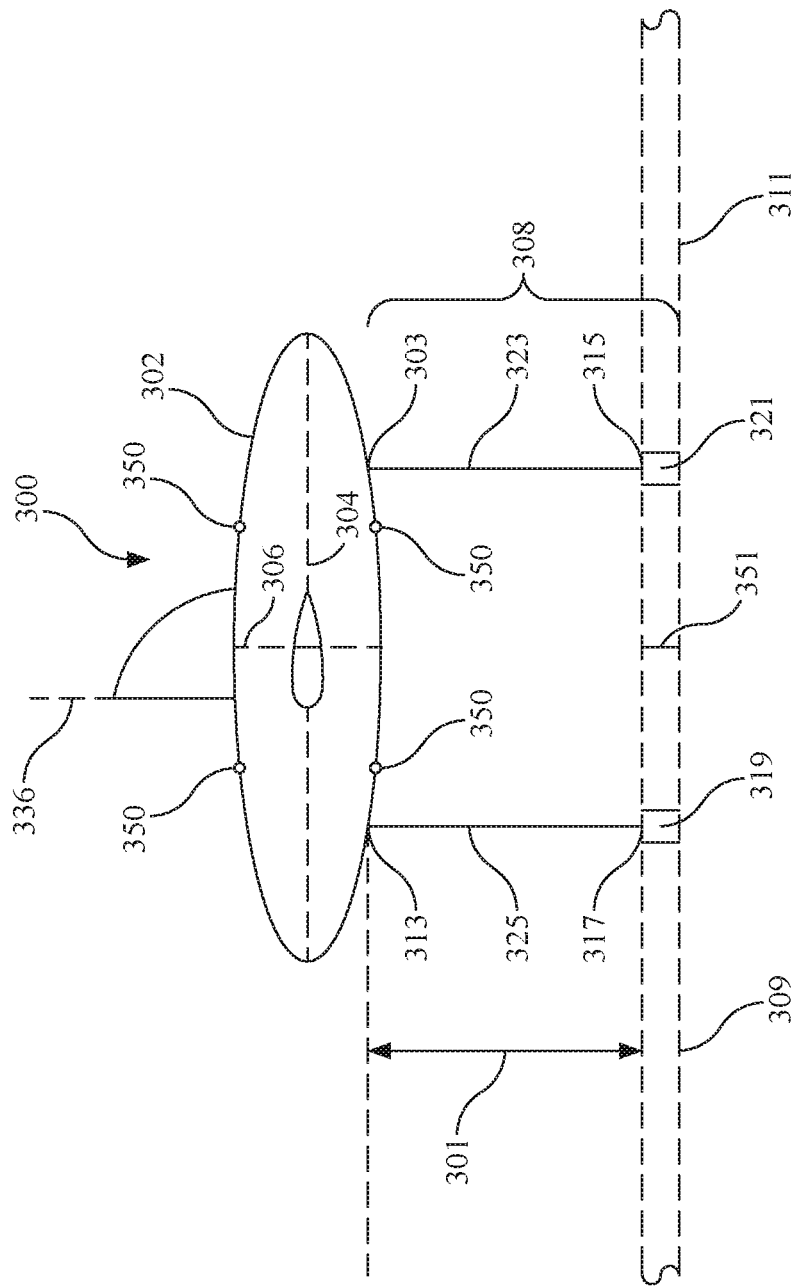
FIG. 3 is a schematic representation of an embodiment of a submerged front end buoy attached to a lead-in cable and a streamer.
Figure 4:
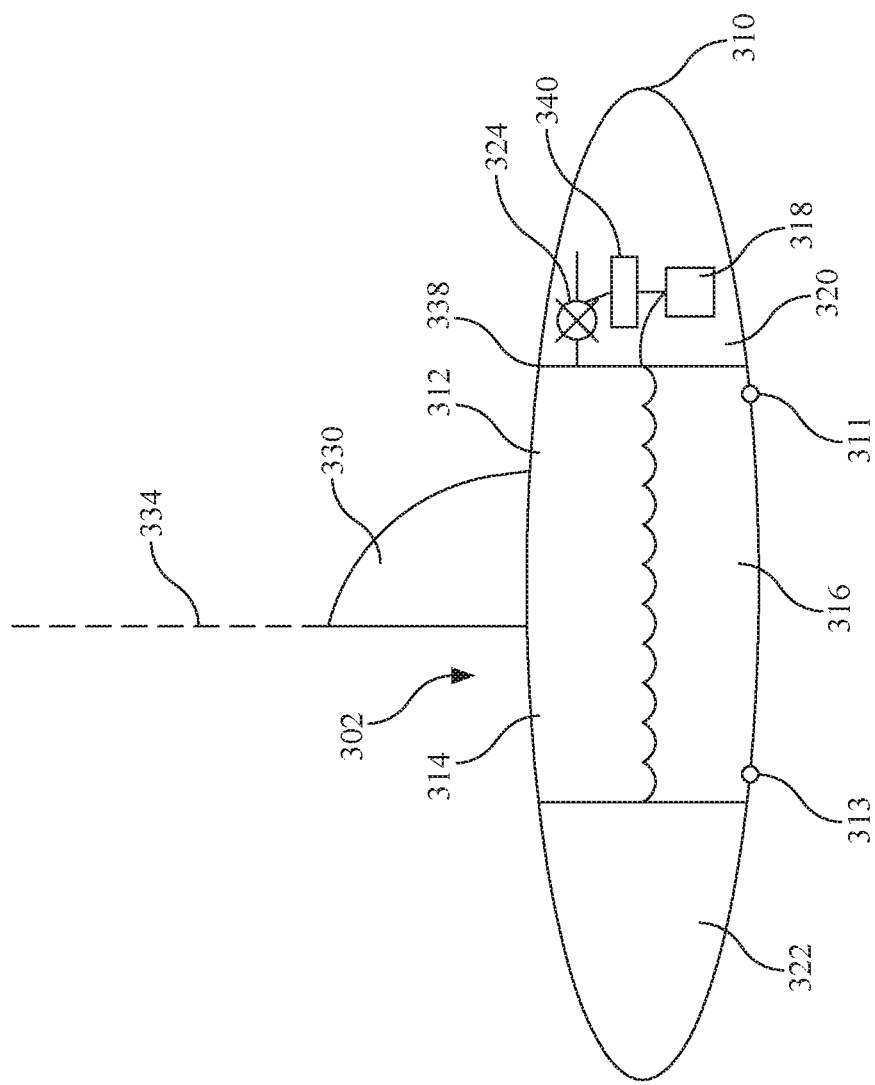
FIG. 4 is a schematic representation of a cut-way view of the body of the submerged front end buoy.
Figure 5:
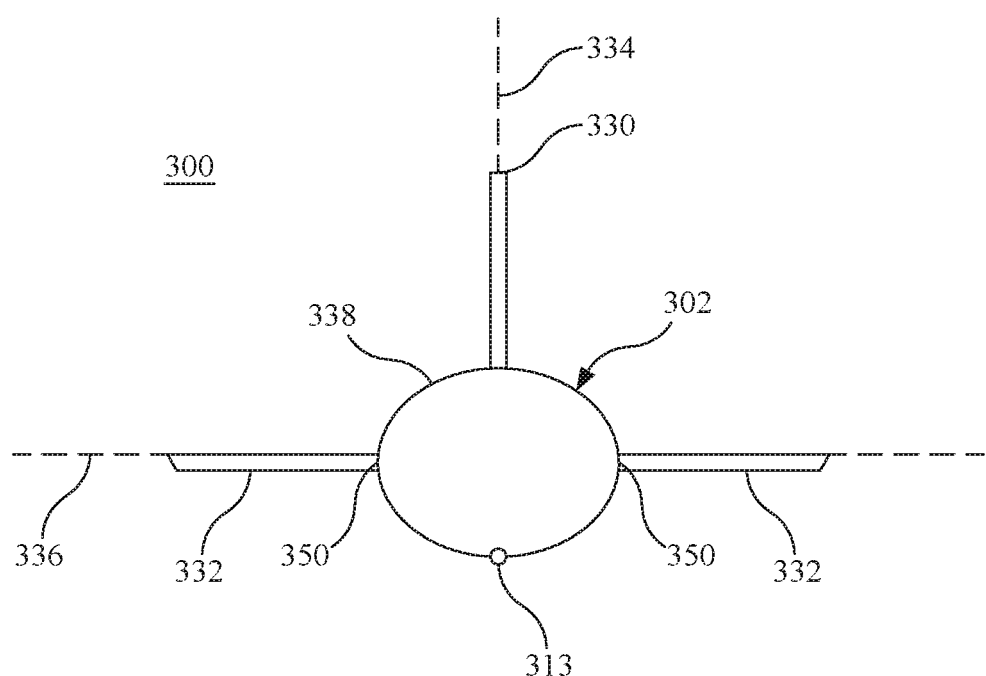
FIG. 5 is a schematic representation of a front of the submerged front end buoy.

Referring to FIGS. 3-5, an embodiment of a submerged front end buoy 300 is illustrated. The submerged front end buoy includes a body 302. Suitable shapes for the body include hydrodynamic shapes such as elongated shapes and torpedo shapes that facilitate movement of the body through the water. In one embodiment, the body has an elongated shape with a long axis 304 and a short axis 306 perpendicular to the long axis. In one embodiment, the body has a length along the long axis of amount 2 to about 3 meters and a width along the short axis of about 1 meter.

The submerged front end buoy includes a connecting mechanism 308 that is in communication with the body 302 and is configured to connect the front end buoy to at least one of a seismic streamer 311 and a lead-in cable 309 connected to the seismic streamer. The connecting mechanism spaces the front end buoy above the seismic streamer and lead-in cable a desired distance 301. In one embodiment, this desired distance is less than or equal to about 50 cm, preferably less than or equal to about 40 cm. Alternatively, the attachment mechanism can directly attach the body to at least one of the seismic streamer and the lead-in cable.

In one embodiment, the connecting mechanism includes a first body attachment point 303 disposed on the body and a first streamer attachment point 315 configured to attach the seismic streamer 311. The first body attachment point is in communication with the first streamer attachment point. The first body attachment point can be directly attached to the first streamer attached point. In one embodiment, the first body attachment point is connected to the first streamer attachment point through at least one rod or cable 323. The cable has a length corresponding to the desired distance of separation 301 between the front end buoy and the seismic streamer or lead-in cable. The first streamer attachment point 315 can be directly attached to the seismic streamer or lead-in cable. Alternatively, the connecting mechanism includes a swivel mechanism 321 attached to the first streamer attachment point. This swivel mechanism facilitates relative movement between the first streamer attachment point and the seismic streamer, for example, as caused by a twisting of the seismic streamer.

In one embodiment, the connecting mechanism includes a second body attachment point 313 disposed on the body and a second streamer attachment point 317 configured to attach to at least one of the seismic streamer 311 and the lead-in cable 309. Preferably, the second streamer attachment point is attached to the lead-in cable. Therefore, the first and second streamer attachment points straddle a connection joint 351 between the lead-in cable and the seismic streamer. The second body attachment point is in communication with the second streamer attachment point. While the first and second streamer attachment points have been illustrated as being connected to the seismic streamer and lead-in cable, these points can also be connected to bend restrictors (not shown) place around the seismic streamer and lead-in cable adjacent the connection joint. Suitable bend restrictors are known and available in the art.

The second body attachment point can be directly attached to the second streamer attached point. In one embodiment, the second body attachment point is connected to the second streamer attachment point through at least one rod or cable 325. The cable has a length corresponding to the desired distance of separation 301 between the front end buoy and the seismic streamer or lead-in cable. Therefore, the connecting mechanism includes two connecting cables, each one associated with one of the pairs of body and seismic streamer attachment points. The second streamer attachment point 317 can be directly attached to the seismic streamer or lead-in cable. Alternatively, the connecting mechanism includes a swivel mechanism 319 attached to the second streamer attachment point. This swivel mechanism facilitates relative movement between the first streamer attachment point and the seismic streamer or lead-in cable, for example, as caused by a twisting of the seismic streamer or lead-in cable.

The body can also include a plurality of additional attachment points 350 disposed along an exterior surface of the body. These additional attachment points can be used to connect the body to spreader cables placed between buoys.

The submerged front end buoy also includes a depth adjustment mechanism associated with the body to set a depth of the submerged front end buoy. This depth control mechanism includes one or more components that can be used to control the depth of the submerged front end buoy. These components include an adjustable buoyancy mechanism and a plurality of wings extending out from the exterior surface of the body. In one embodiment, the depth adjustment mechanism includes an adjustable buoyancy mechanism having at least one chamber 312 disposed within the body. This chamber can occupy the entire interior volume of the body or a portion of the interior volume of the body. The chamber is configured to hold an adjustable volume of air 314 or gas and water 316.

The buoyancy of the submerged front end buoy is controlled, from negative buoyancy, through neutral buoyancy to positive buoyancy, by setting the relative volume of air and water in the chamber. Changing the proportion of water and air modifies the depth of the submerged front end buoy and the seismic streamer and lead-in cable attached to the submerged front end buoy. Thus, the submerged front end buoy when the proportion of water increases in the chamber, and conversely, it goes up toward the sea surface when the proportion of air increases in the chamber. In one embodiment, the buoyancy is adjusted to provide sufficient positive buoyancy to submerged front end buoy that when combined with the negative buoyancy of the lead-in cable and the seismic streamer, positions the submerged front end buoy at given distance below the surface of the water. Suitable positive buoyancies for the submerged front end buoy include, but are not limited to, from about 1 to about 2 tons of positive buoyancy.

The buoyancy adjustment mechanism includes a source of compressed gas or air 318 in communication with the at least one chamber. The source of compressed air can be controllable introduced into the chamber and can increase the pressure in the chamber to drive water out of the chamber. The buoyancy adjustment mechanism also includes a valve 324 in fluid communication with the chamber and exterior surface 338 of the body. Opening the valve allows water to move between the ambient environment and the chamber. A pump (not shown) can also be included in communication with the valve to assist in moving water between the ambient environment and the chamber. The valve and source of compresses air are disposed within the body, and in one embodiment are located within a stern chamber 320 between the buoyancy chamber 312 and the streamer 311. In one embodiment, the stern chamber 33 is filled with the compressed air.

The submerged front end buoy includes control electronics 340 in communication with the source of compressed air and valve to control the relative volumes of air and water in the chamber 312. The control electronics function as part of the adjustable buoyancy mechanism as a control mechanism in communication with the source of compressed air and the valve to adjust a volume of water in the chamber to control buoyancy of the submerged front end buoy. In one embodiment, the control electronics are located within the stern chamber. The control electronics can be pre-programmed, such that the submerged front end buoy controls the buoyancy autonomously using additional sensors provided in the submerged front end buoy or located within the control electronics. Alternatively, the buoyancy mechanism and any other mechanism on the submerged front end buoy can be controlled remotely through either a wired or wireless connection. Therefore, the submerged front end buoy, and in particular the control electronics, include a communication module in communication with the depth control mechanism for remote control of the depth of the submerged front end buoy. Additional elements in the control electronics for location, positioning and depth control of the submerged front end buoy and depth control mechanism include at least one of an acoustic transponder and a global positioning system.

In one embodiment, the depth adjustment mechanism also includes at least one control wing extending from the exterior surface of the body. Such wings work in conjunction with the location of the first attachment point in changing the depth and lateral location of the submerged front end buoy. Suitable wings include fixed wings and moveable or adjustable wings such as active foils, which are in communication with the control electronics. As illustrated, the at least one control wing includes a first control wing 330 extending from the exterior surface of the body along the first axis 334 and a pair of second control wings 332 extending from opposites sides of the body along the second axis 336, which is perpendicular to the first axis. The first axis and second axis are parallel to or radially aligned with the short axis of the body.

Figure 6:
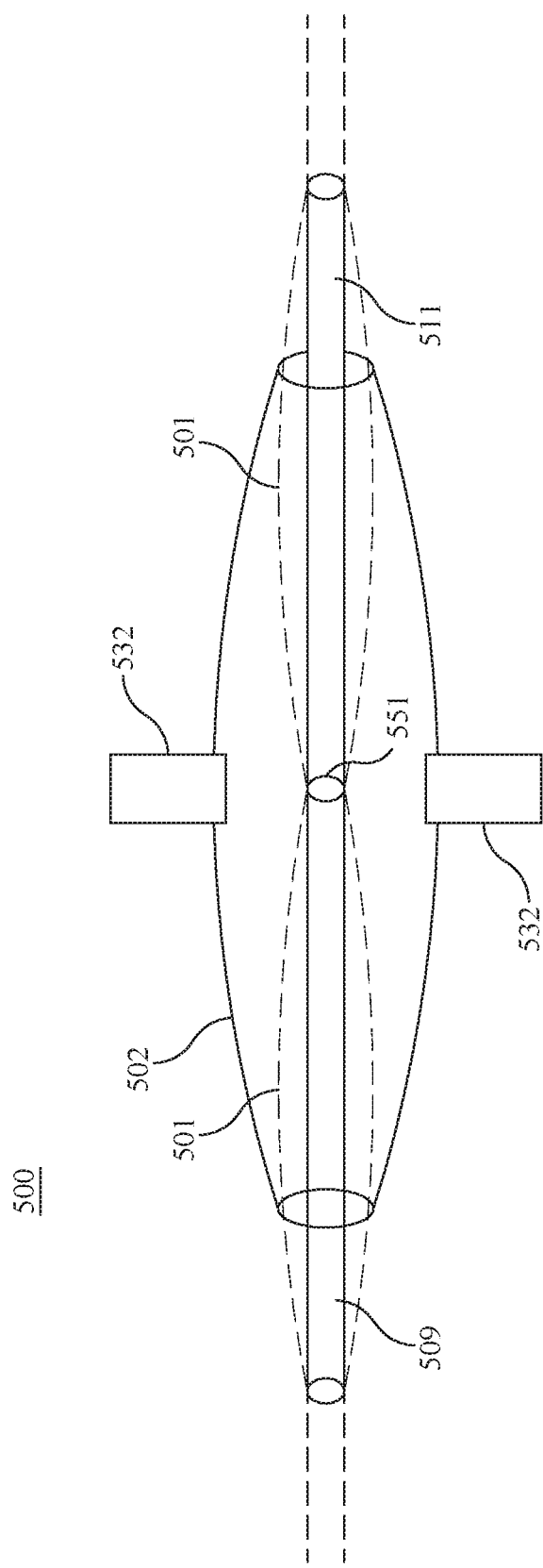
FIG. 6 is a schematic representation of another embodiment of a submerged front end buoy attached to a lead-in cable and a streamer.

Referring to FIG. 6, in one embodiment, the submerged front end buoy 500 includes a body 502 arranged as a sleeve or collar that fits over the connecting joint 551 between the lead-in cable 509 and the seismic streamer 511. Therefore, the sleeve arrangement is the connecting mechanism of the submerged front end buoy. Again, bend restrictors 501 can be placed around the lead-in cable and the seismic streamer, and the body surrounds are least a portion of each bend restrictor. The submerged front end buoy of this embodiment includes the depth adjustment mechanism as described herein including the adjustable buoyancy mechanism and the wings 532.

The submerged front end buoy can be incorporated into a submerged front end buoy system that includes the submerged front and buoy, the seismic streamer and the lead-in cable and is pulled by a towing vessel. In addition, these submerged front end buoy systems can be combined into multiple strings or used in a seismic data acquisition system in combination with seismic sources.

Figure 7:
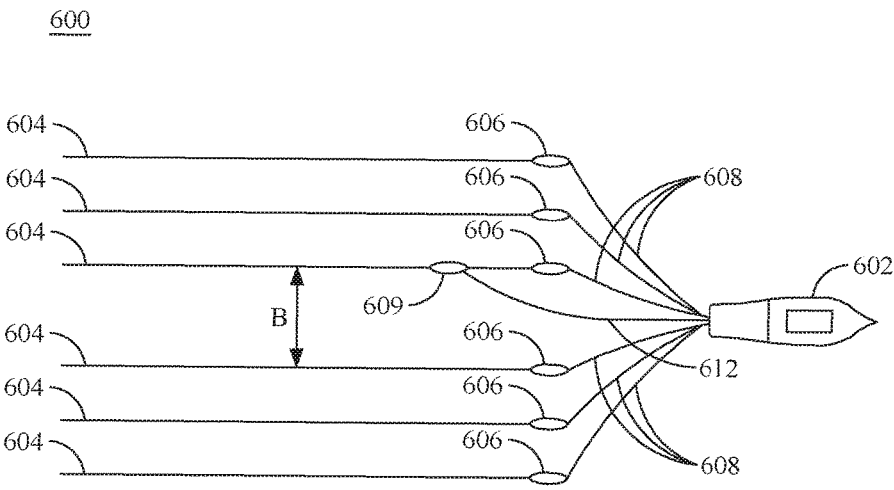
FIG. 7 is a representation of an embodiment of a seismic data acquisition system containing a plurality of submerged front end buoy systems.
Figure 8:
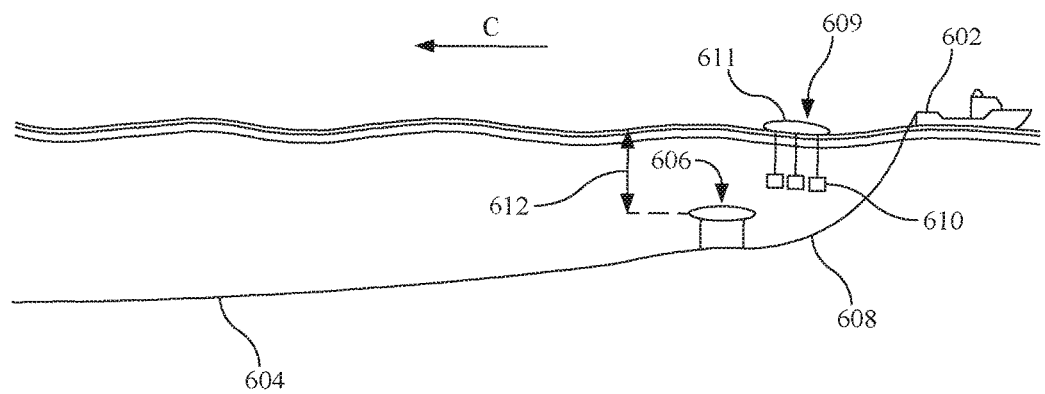
FIG. 8 is a representation of an embodiment of a submerged front end buoy system.

Referring to FIGS. 7 and 8, embodiments of these submerged front end buoy systems and seismic data acquisition systems 600 are illustrated. The seismic data acquisition system includes one or more submerged front end buoy systems. Therefore, the seismic data acquisition system includes a plurality of lead-in cables 608 extending from and towed by a towing vessel 602. The seismic data acquisition array also includes a plurality of seismic streamers 604 attached to the lead-in cables and also extending from the towing vessel. Suitable arrangements of lead-in cables and seismic streamers are known and available in the art. A plurality of submerged front end buoys 606 also included. Any suitable arrangement of a submerged front end buoy as described herein can be used.

Also included in the seismic data acquisition system is at least one seismic source 609 spaced from the towing vessel 602. Each seismic source can be towed by the towing vessel using a suitable towing cable 612 as known and available in the art. The depth adjustment mechanism of each submerged front end buoy facilitates location of the submerged front end buoy at a depth 612 below the surface of the water that is greater than the seismic source 609. This includes the buoy 611 associated with the seismic source, which is typically a surface buoy, and any individual source or gun 610 attached to the surface buoy. Therefore, the seismic source is free to move backward from the towing vessel in a direction indicated by arrow C while a lateral offset distance between the seismic source and the seismic streamer in a directed indicated by arrow B is about zero.

In addition, the submerged front end buoy facilitates towing a seismic spread under the surface of the water in order to mitigate the impact of floating obstacles and debris, e.g., fish nets, trees, drift wood and ice and to mitigate the impact of weather condition. The submerged front end buoy is suitable for use in seismic data surveys in arctic waters in order to avoid floating ice. Suitable applications for the submerged front end buoy include, but are not limited to, two-dimensional (2D) marine seismic data acquisition, three-dimensional (3D) marine seismic data acquisition, four-dimensional (4D) marine seismic data acquisition, arctic zones with growlers and other zones with surface obstructions such as floating islands and fishing gear.

Figure 9:
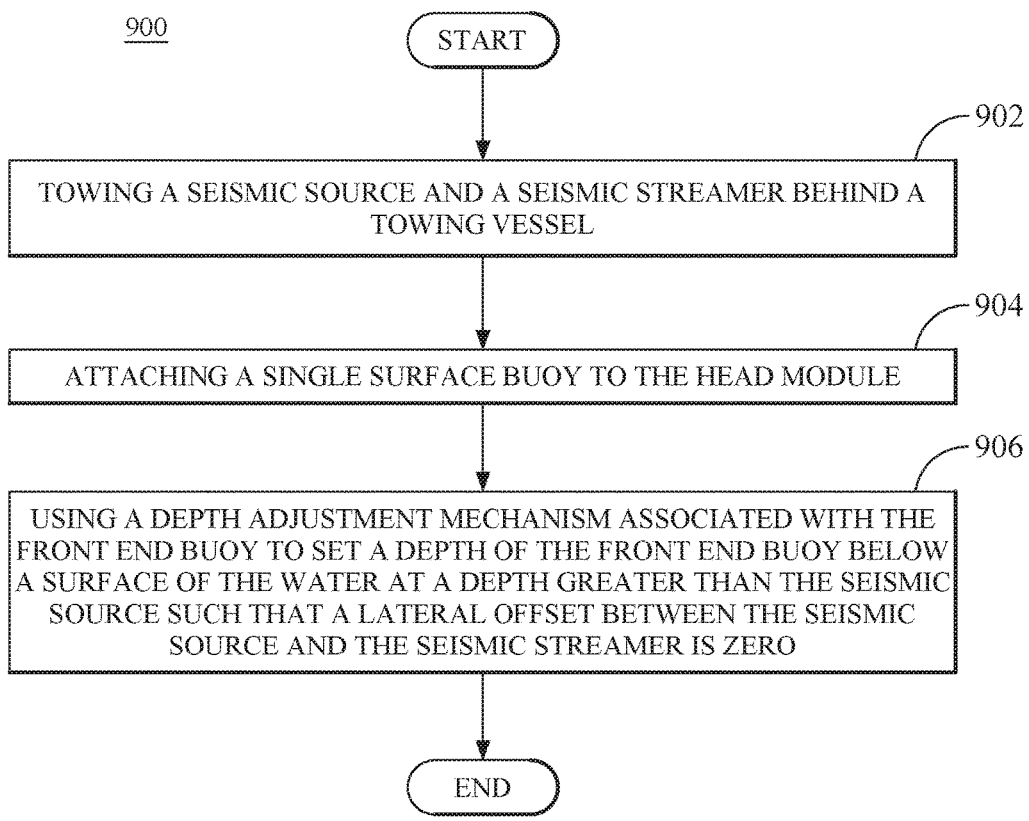
FIG. 9 is a flow chart of an embodiment of a method for acquiring seismic data using a submerged front end buoy.

Arrangements and embodiments of the submerged front end buoy as disclosed herein can be used with seismic data acquisition systems to acquire seismic data. Referring to FIG. 9, an embodiment is directed to a method for acquiring seismic data using a submerged front end buoy 900. A seismic source and a seismic streamer are towed behind a towing vessel 902. Alternatively, a plurality of seismic sources and a plurality of seismic streamers are towed behind the towing vessel. A connecting mechanism is used to attach a front end buoy to the seismic streamer 904. Any suitable arrangements of the connecting mechanism and front end buoy are disclosed herein can be used. In one embodiment, the connecting mechanism includes a first body attachment point disposed on a body of the front end buoy, a first streamer attachment point in communication with the seismic streamer and a connecting cable attached to and extending between the first body attachment point and the first streamer attachment point. The connecting cable has a length of less than about 50 cm.

A depth adjustment mechanism is associated with the front end buoy to set a depth of the front end buoy below a surface of the water at a depth greater than the seismic source such that a lateral offset between the seismic source and the seismic streamer is zero 906. Any suitable depth adjustment mechanism as described herein can be used. In one embodiment, the depth adjustment mechanism includes an adjustable buoyancy mechanism and at least one control wing extending from an exterior surface of the body. The buoyancy adjustment mechanism includes a chamber disposed within the body, a source of compressed air in communication with the chamber and a valve in fluid communication with the chamber and exterior surface of the body.

Although the features and elements of the present exemplary embodiments are described in the embodiments in particular combinations, each feature or element can be used alone without the other features and elements of the embodiments or in various combinations with or without other features and elements disclosed herein. Any methods provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A submerged front end buoy comprising:
a body;
a connecting mechanism in communication with the body, the connecting mechanism configured to connect the front end buoy to at least one of a seismic streamer and a lead-in cable connected to the seismic streamer; and
a depth adjustment mechanism disposed within the body and configured to set a depth of the front end buoy below a surface of the water,
wherein the body is not attached to any element floating on the water.

2. The submerged front end buoy of claim 1, wherein the depth adjustment mechanism comprises an adjustable buoyancy mechanism comprising:
a chamber;
a source of compressed air in communication with the chamber; and
a valve in fluid communication with the chamber and exterior surface of the body.

3. The submerged front end buoy of claim 2, wherein the adjustable buoyancy mechanism further comprises a control mechanism in communication with the source of compressed air and the valve to adjust a volume of water in the chamber to control buoyancy of the submerged front end buoy.

4. The submerged front end buoy of claim 2, wherein the depth adjustment mechanism further comprises at least one control wing extending from the exterior surface of the body.

5. The submerged front end buoy of claim 4, wherein the at least one control wing comprises an active foil.

6. The submerged front end buoy of claim 4, wherein the at least one control wing comprises a first control wing extending from the exterior surface of the body along a first axis and a pair of second control wings extending from opposites sides of the body along a second axis perpendicular to the first axis.

7. The submerged front end buoy of claim 1, wherein the connecting mechanism is further configured to space the body from the streamer a distance less than about 50 cm.

8. The submerged front end buoy of claim 1, wherein the connecting mechanism further comprises:
a first body attachment point disposed on the body; and
a first streamer attachment point configured to attach to the seismic streamer, the first body attachment point in communication with the first streamer attachment point.

9. The submerged front end buoy of claim 8, wherein the connecting mechanism further comprises a connecting cable attached to and extending between the first body attachment point and the first streamer attachment point, the connecting cable having a length of less than about 50 cm.

10. The submerged front end buoy of claim 8, wherein the connecting mechanism further comprises a swivel mechanism attached to the first streamer attachment point, the swivel mechanism configured to facilitate relative movement between the first streamer attachment point and the streamer.

11. The submerged front end buoy of claim 8, wherein the connecting mechanism further comprises:
a second body attachment point disposed on the body; and
a second streamer attachment point configured to attach to at least one of the seismic streamer and the lead-in cable, the second body attachment point in communication with the second streamer attachment point.

12. The submerged front end buoy of claim 11, wherein the second streamer attachment point is configured to attach to the lead-in cable.

13. The submerged front end buoy of claim 1, further comprising a communication module disposed in the body in communication with the depth adjustment mechanism for remote control of the depth of the submerged front end buoy.

14. The submerged front end buoy of claim 1, further comprising at least one of an acoustic transponder and a global positioning system disposed within the body.

15. The submerged front end buoy of claim 1, further comprising a plurality of additional attachment points disposed along an exterior surface of the body.

16. A submerged front end buoy system comprising:
a seismic streamer;
a lead-in cable attached to the seismic streamer; and
a submerged front end buoy comprising:
a body;
a connecting mechanism in communication with the body, the connecting mechanism comprising:
a first body attachment point disposed on the body;
a first streamer attachment point in communication with the seismic streamer;
a second body attachment point disposed on the body;
a second streamer attachment point in communication with the lead-in cable; and
two connecting cables, each connecting cable attached to and extending between each one of the first body attachment point and the first streamer attachment point and the second body attachment point and the second streamer attachment point; and
a depth adjustment mechanism disposed within the body and configured to set a depth of the front end buoy below a surface of the water,
wherein the body is not attached to any element floating on surface of the water.

17. The submerged front end buoy system of claim 16, wherein each connecting cable has a length of less than about 50 cm.

18. The submerged front end buoy system of claim 16, wherein the depth adjustment mechanism comprises:
- an adjustable buoyancy mechanism comprising:
  - a chamber;
  - a source of compressed air in communication with the chamber; and
  - a valve in fluid communication with the chamber and exterior surface of the body; and
- at least one control wing extends from an exterior surface of the body.

19. A method for acquiring seismic data using a submerged front end buoy, the method comprising:
- towing a seismic source and a seismic streamer behind a towing vessel;
- using a connecting mechanism to attach a front end buoy to the seismic streamer; and
- using a depth adjustment mechanism within the front end buoy to set a depth of the front end buoy below a surface of the water at a depth greater than the seismic source such that a lateral offset between the seismic source and the seismic streamer is zero, wherein the front end buoy is not attached to any element floating on the water.

20. The method of claim 19, wherein:
the connecting mechanism comprises:
- a first body attachment point disposed on a body of the front end buoy;
- a first streamer attachment point in communication with the seismic streamer; and
- a connecting cable attached to and extending between the first body attachment point and the first streamer attachment point, the connecting cable comprising a length of less than about 50 cm; and the depth adjustment mechanism comprises an adjustable buoyancy mechanism comprising:
- a chamber;
- a source of compressed air in communication with the chamber;
- a valve in fluid communication with the chamber and exterior surface of the body; and
- at least one control wing extending from an exterior surface of the body.

* * * * *